Oct. 11, 1938.   D. H. DAVIS   2,132,725
AXLE
Filed April 23, 1936
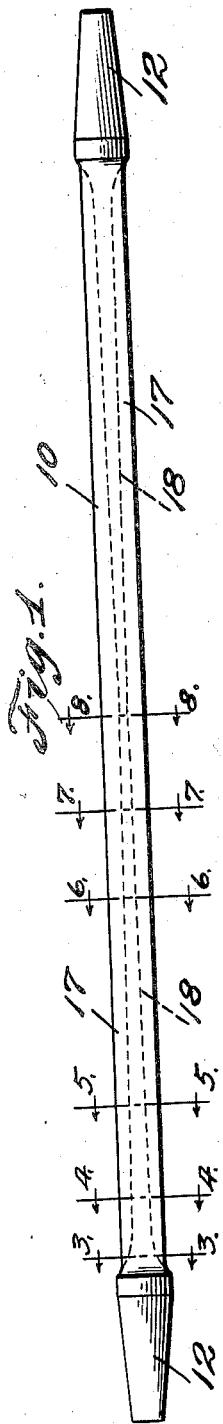
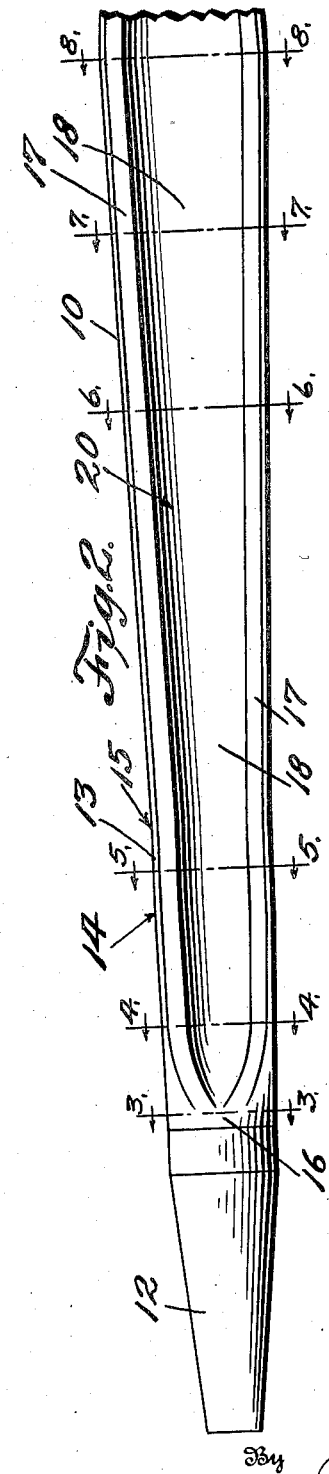
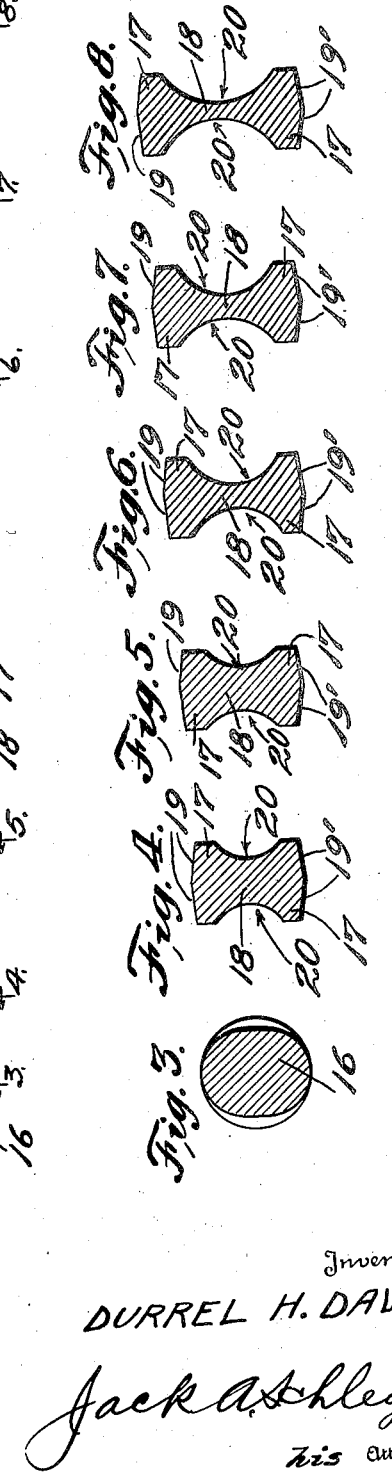
Inventor:
DURREL H. DAVIS,
By Jack A. Ashley
His Attorney.

Patented Oct. 11, 1938

2,132,725

UNITED STATES PATENT OFFICE 2,132,725

AXLE

Durrel H. Davis, Augusta, Kans., assignor to Spencer Trailer Company, a co-partnership consisting of Fred G. Spencer and Bertha Spencer, Augusta, Kans.

Application April 23, 1936, Serial No. 75,973

4 Claims. (Cl. 301—124)

This invention relates to axles and, without limitation thereto, it has more particularly to do with automobile trailer and like vehicle axles.

The main object of the invention is to obtain maximum strength with minimum weight throughout and a substantial reduction in deflection at the center of the axle.

An important object is to secure a true beam effect in an axle by increasing the vertical strength thereof starting back of the spindle portion and continuing to the center of the axle and increasing the horizontal strength at the point where the maximum strain occurs, and at the same time providing for resistance to torsional strain.

Another object of the invention is to produce a structure wherein there is no sudden or abrupt change in any section where stresses might localize and cause breakage.

A still further object is to produce an axle structure wherein every cross-section throughout its length between the spindles contains substantially the same area of metal.

A still further object of the invention is to reduce the cost of forging the axle blank through the use of round bar material for the forging, and, at the same time, minimize the flow of the metal in the forging operation.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a top plan view of an axle formed in accordance with the invention;

Figure 2 is a view, on an enlarged scale, and in front elevation, of one-half of the axle structure shown in Figure 1; and Figures 3 to 8, inclusive, are cross-sections on the correspondingly indicated lines 3—3 to 8—8, inclusive, of Figures 1 and 2.

Referring now to the drawing, the numeral 10 designates, generally, the axle body as a whole. As shown, the axle has the usual spindle portion 12 at its end, and inwardly from each spindle portion 12, a levelled seat portion 13 is provided between the space indicated at 14, 15, as shown in Figure 2.

As shown in Figure 3, the cross-section of the axle in the immediate region inwardly from the spindle portion 12 and substantially on the line 3—3, is elliptical, with the long axis of the ellipse vertically disposed. The major body portion of the axle between the elliptical portions 16 is of substantially I-shape throughout and at every line of section the area of the metal is substantially the same, the differences being in the vertical and certain transverse dimensions, illustrations of which appear in Figures 4 to 8, inclusive, of the drawing.

The cross-section shown in Figure 8, is taken at the vertical center of the axle from which place the axle tapers in a vertical plane towards its spindle portion 12. However, the width of the bulbed or flanged top and bottom portions 17 may or may not be the same throughout the length of the axle.

The height and width of the body web portion 18 intermediate the top and bottom flanged or bulbed portions 17 does vary, as indicated in Figures 4 to 8, inclusive. It may be here noted that the mergence of every cross-section from one to the other throughout the length of the axle is gradual and without any sudden or abrupt change. This is an important feature of the invention, as it not only gives strength to the axle but enters into the facility with which the process of forging and forming the axle is carried out. It may be here further noted that the cross-sectional form of the axle is not of the ordinary or conventional cross-section of the regular commercial I-beams or angle iron sections, but the cross-sectional form of the axle is, in effect, a modification of the ordinary or conventional I-section and the peculiar cross-section illustrated in the drawing is utilized to facilitate forging or forming the axle from round bar stock. So, too, in forming the particular cross-sections, as indicated in the drawing, the flow of the metal is appreciably reduced in the forging process.

By referring to Figures 4 to 8, inclusive, it is noted that the top and bottom faces 19 and 19', respectively, of the bulbed or flanged portions 17 are slightly bevelled or inclined on opposite sides of a median longitudinal line, and the recesses 20 on opposite sides of the body web 18 are formed arcuately, and, in this connection, it may be here repeated that the only appreciable difference in dimension is in the web portion 18 of the axle, it being borne in mind, however, that the cross-sectional area of the metal is substantially the same at every point throughout the length of the axle, that is to say, at every point between the spindle portions 12, which latter, of course, are usually tapered towards their outer ends.

While the illustration in the accompanying drawing is that of a practical adaptation of the invention, it is understood that the form and contour of the axle, both longitudinally and in cross-section, may be changed and modified in many respects without departing from the spirit and scope of the invention as herein described and defined in the appended claims. The invention, therefore, is not limited to the specific form and construction shown in the accompanying drawing, as the general broad object of the invention is mainly to design an axle so as to provide the greatest amount of strength possible at each point thereof to resist the bending tendency of the axle due to the load or forces to which it is subjected; or, in other words, the axle is designed and ideally shaped in keeping with the bending moment diagram for the vertical, horizontal and torsional loads.

What I claim and desire to secure by Letters Patent, is:

1. An axle, the major body portion of which is of substantially I-shape in cross-section and varying in vertical and transverse dimensions, but being of the same area at every line of cross-section, the webbed body portion being formed by roundingly channeling the axle on opposite sides and merging with flanged top and bottom portions having faces sloping on opposite sides of median longitudinal lines, and the portions of different cross-sectional contour and dimensions merging with each other without sudden or abrupt change.

2. An axle comprising an elongate integral body, longitudinally channeled and of substantially the same cross-sectional area at every point throughout its length, the web portion of the body varying in vertical and horizontal dimensions at every point and having surface contour mergence without sudden or abrupt change throughout the extent thereof.

3. An axle comprising an elongate integral body, longitudinally channeled on opposite sides and of substantially the same cross-sectional area at every point throughout its length, the web portion of the body varying progressively in vertical and transverse dimensions throughout its extent and having surface contour mergence without sudden or abrupt change.

4. An axle comprising an elongate integral body of substantially the same cross-sectional area throughout the major portion of its length and being longitudinally channeled arcuately on opposite sides, the web portion of the body being of maximum vertical width dimension at the middle of the axle and it diminishing progressively and symmetrically in such dimension towards each end, the transverse thickness dimension of the web being minimum at the middle of the axle and such dimension increasing towards the ends of the axle proportionately to the decrease in vertical width dimension, and the web surfaces having mergence without sudden or abrupt change throughout the extent thereof.

DURREL H. DAVIS.